June 18, 1963  A. W. McCLURE  3,094,272
MOTOR-COMPRESSOR APPARATUS
Filed Dec. 9, 1960  2 Sheets-Sheet 1

INVENTOR.
ARTHUR W. MC CLURE
BY
*Holmes & Andersen*
ATTORNEYS

June 18, 1963     A. W. McCLURE     3,094,272
MOTOR-COMPRESSOR APPARATUS

Filed Dec. 9, 1960     2 Sheets-Sheet 2

*INVENTOR.*
ARTHUR W. MC CLURE
BY
ATTORNEYS 3,094,272
MOTOR-COMPRESSOR APPARATUS
Arthur W. McClure, La Crosse, Wis., assignor to The Trane Company, La Crosse, Wis., a corporation of Wisconsin
Filed Dec. 9, 1960, Ser. No. 74,856
2 Claims. (Cl. 230—117)

This invention relates generally to assemblies of motors and centrifugal compressors. More specifically, this invention relates to apparatus having a centrifugal compressor and a fluid cooled motor both of which are mounted in a unitary sealed casing.

Prior to this invention, compressors of this type have had a motor casing, a bearing plate at each end of the motor, an impeller housing member and a suction cover member secured to the impeller housing. Two stage compressors have had impeller housing members and suction cover members for each stage.

It is an object of this invention to provide a simplified compressor having a casing enclosing the motor, an end plate in the casing at each end to support the bearings and an impeller housing which eliminates the need for a suction cover thus reducing the number of major components and at the same time simplifying the components.

It is another object of this invention to provide entrance passageways for cooling gas at each end of the motor between the motor frame and the end plates and to provide fans for moving the cooling gas over the rotor and the windings of the stator and through passageways in the stator of the motor to a peripheral chamber formed between the motor frame and the casing.

Figure 1:
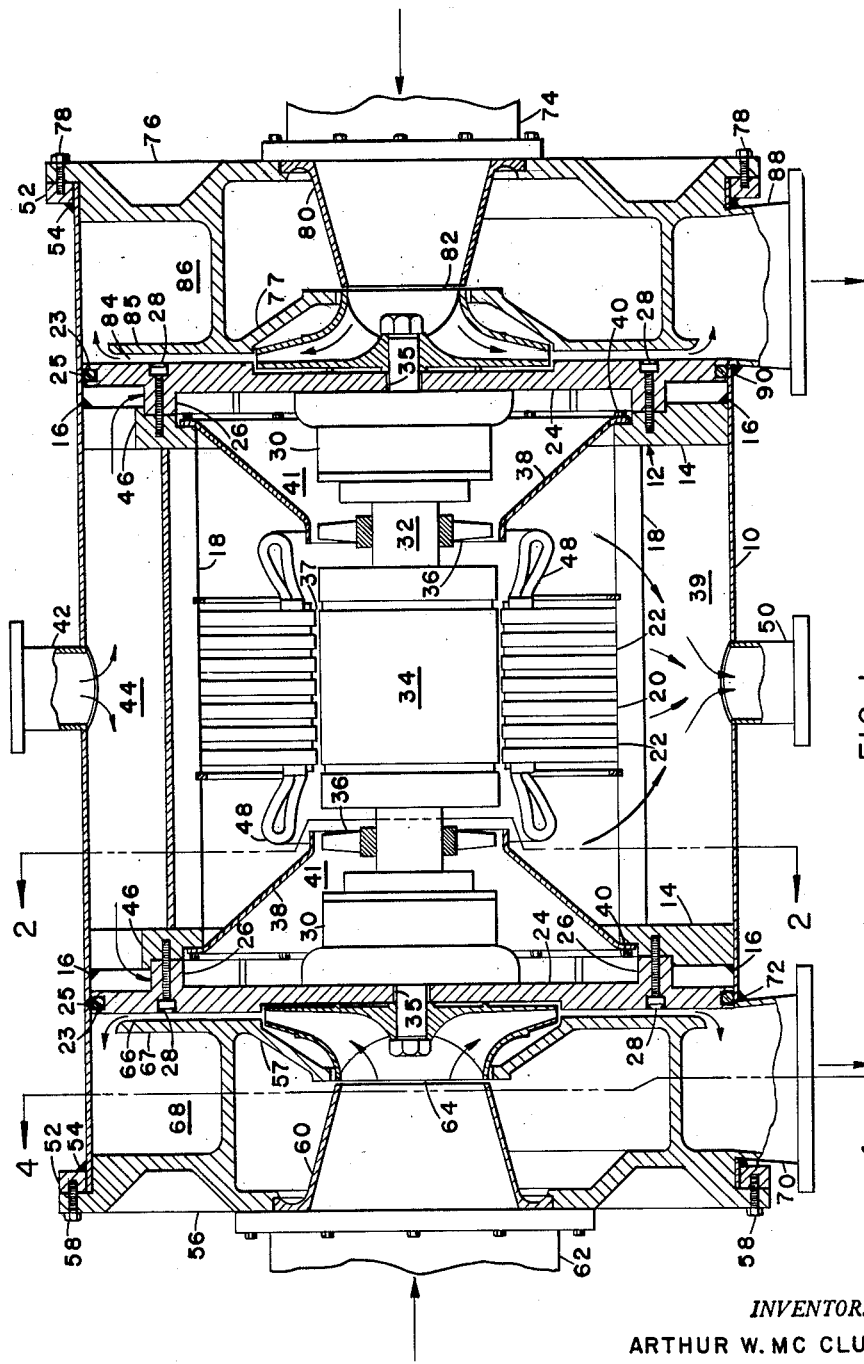
Figure 2:
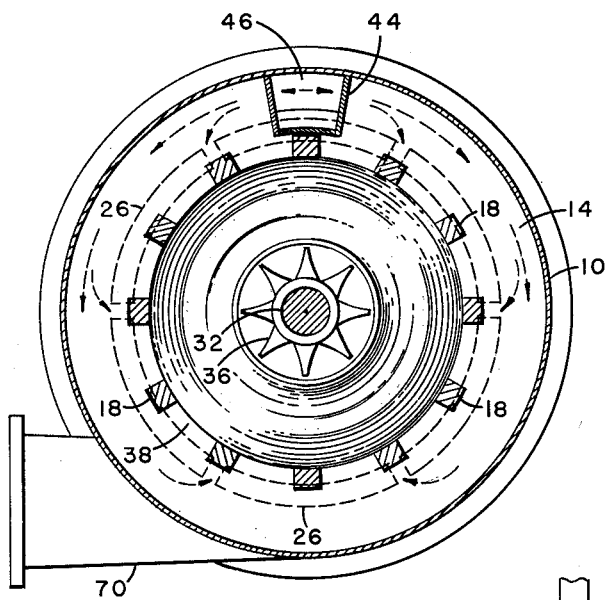
Figure 3:
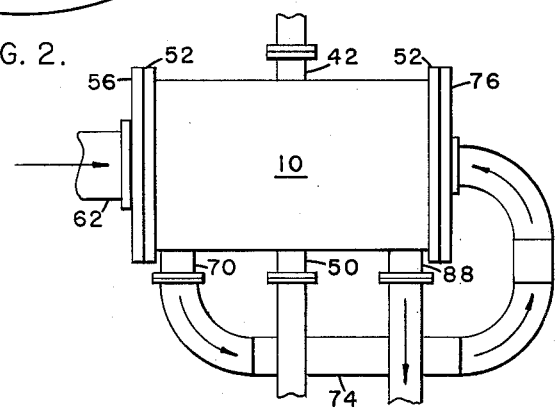
Figure 4:
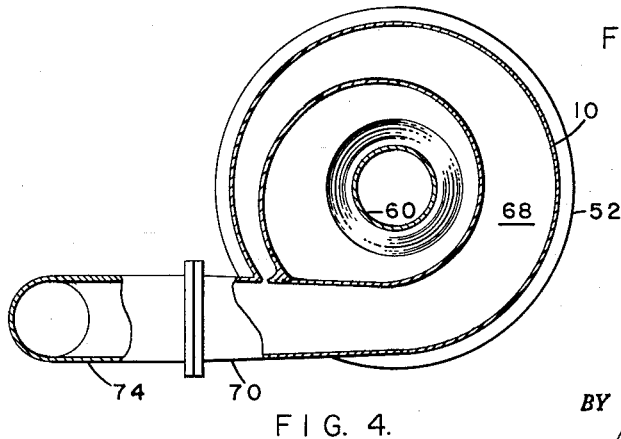

Other objects and advantages of this invention will become apparent as the specification proceeds to describe the invention in detail with reference to the accompanying drawings in which:

FIGURE 1 is a cross-sectional view of the apparatus taken on a horizontal axial plane;
FIGURE 2 is a sectional view taken on line 2—2 of FIGURE 1;
FIGURE 3 is a plan view of the apparatus including the gas conduit from the first to the second stage;
FIGURE 4 is a sectional view taken on line 4—4 of FIGURE 1.

Referring now to the drawings, a cylindrical annular casing 10 preferably of steel plate supports a motor frame indicated generally by numeral 12. End rings 14 of the motor frame 12 are secured to the casing 10 by welds 16. Bars 18 are welded at each end to the end rings 14. The inner surfaces of the bars 18 lie on a cylinder and support an annular motor stator 20 having passageways 22 therein. End plates 24 have spaced segmental bosses 26 which are supported on the end rings 14 and held thereto by bolts 28. Bearings 30 are supported on the end plates 24 and rotatably support a shaft 32. A motor rotor 34 is secured to the shaft 32.

The end plates 24 are in sealing engagement with the casing 10. A groove 23 containing an O-ring gasket 25 of "neoprene" or other similar resilient material may be used to provide the seal. Some leakage can be tolerated. Therefore the end plates 24 may be machined to closely fit the casing 10, thus eliminating the need for the O-ring gasket.

The shaft 32 is in rotational sealing engagement with the end plates 24 at 35. The well-known labyrinth seal (not shown) may be used to provide a seal with clearance.

Annular shrouds 38 are secured by bolts 40 to the end rings 14. The annular shrouds 38, the end rings 14, and the casing 10 form a motor chamber 39. The annular shrouds 38 and the end plates 24 form end chambers 41.

Fans 36 are secured to shaft 32 and operate within the annular shrouds 38 to move the cooling fluid from end chambers 41 to the motor chamber 39.

A conduit 42 on the casing 10 is adapted to be connected to a source of cooling fluid under pressure such as the refrigerant gas from a refrigerating machine of which the compressor is a part. A manifold 44 conducts the cooling fluid from the conduit 42 to openings 46 in the end rings 14. The cooling fluid then flows between the segmental bosses 26 to the end chambers 41 and thence to the fans 36. Some of the fluid discharged from the fans 36 flows into the gap 37 between the rotor 34 and the stator 20. The cooling fluid flows outwardly from the gap 37 through passageways 22 in the stator 20. Some of the cooling fluid discharged from the fans 36 flows outwardly over the motor windings 48 to cool the same. The cooling fluid flows from the casing 10 through a conduit 50. The cooling fluid from conduit 50 is preferably returned to the source.

To each end of the casing 10, flanges 52 are secured as by welds 54. A first stage impeller housing 56 is secured by screws 58 to the flange 52 at one end of the casing 10.

An inlet housing 60 and a suction conduit 62 are secured to the impeller housing 56. A centrifugal impeller 64 is secured to the shaft 32 and is driven thereby. A wall 57 of impeller housing 56 shrouds the impeller 64. The impeller 64 draws gas from inlet housing 60 thus causing gas to flow into inlet housing 60 from conduit 62. The impeller 64 compresses the gas and discharges the gas into a diffuser passageway 66 between the end plate 24 and wall 67 of the impeller housing 56. The gas flows from the diffuser passageway 66 into a volute passageway 68 in the compressor housing 56 and thence into a nozzle 70 which is welded to the casing 10 at 72.

The gas flows from the nozzle 70 into a cross-over conduit 74 leading to the second stage compressor.

A second stage impeller housing 76 is secured by bolts 78 to the flange 52 at the opposite end of the casing 10 from that to which the first stage impeller housing 56 is secured. An inlet housing 80 and the cross-over conduit 74 are secured to the impeller housing 76. An impeller 82 is secured to the shaft 32 and is driven thereby. A wall 77 of impeller housing 76 shrouds the impeller 82. Impeller 82 draws gas from the inlet housing 80, compresses the gas, and discharges it into a diffuser passageway 84 between the end plate 24 and the wall 85 of impeller housing 76. The gas flows from the diffuser passageway 84 into a volute passageway 86, and thence into a nozzle 88 which is welded to the casing 10 at 90.

Although only a preferred embodiment of my invention has been shown and described, it will be apparent to those skilled in the art that various modifications may be made therein without departing from the scope of the invention and I desire to be limited only by the claims.

I claim:
1. Motor-compressor apparatus comprising a substantially annular casing, end rings spacedly mounted in said casing and being secured at their peripheries to said casing, end plates within said casing and being secured to the outside faces of said end rings, means on said end plates in sealing engagement with said casing, a shaft, means on said end plates rotatably supporting said shaft, said shaft extending through said end plates in rotational sealing engagement therewith, impellers mounted on the ends of said shaft, compressor housings mounted in the ends of said casing in cooperative rela- tionship with said impellers, annular shrouds extending inwardly from said end rings toward said shaft, said annular shrouds, said end rings, and said casing forming a motor chamber, said annular shrouds and said end plates forming end chambers at each end of the motor chamber, a motor rotor mounted on said shaft in the motor chamber, a motor stator in the motor chamber, means mounting said motor stator on said end rings, a first conduit adapted to be connected to a source of cooling fluid under pressure, said first conduit being in fluid communication with the interior of said casing between said end rings for conducting cooling fluid to said casing, a second conduit in fluid communication with said first conduit and the end chambers for conducting cooling fluid from said first conduit to the end chambers, said annular shrouds having an internal diameter greater than the portion of the shaft passing therethrough to provide passageways for conducting cooling fluid from the end chambers to the motor chamber, and a third conduit in fluid communication with the motor chamber of said casing for conducting cooling fluid from said casing.

2. Motor-compressor apparatus comprising a substantially annular casing, end rings spacedly mounted in said casing and being secured at their peripheries to said casing, end plates within said casing and being secured to the outside faces of said end rings, means on said end plates in sealing engagement with said casing, a shaft, means on said end plates rotatably supporting said shaft, said shaft extending through said end plates in rotational sealing engagement therewith, impellers mounted on the ends of said shaft, compressor housings mounted in the ends of said casing in cooperative relationship with said impellers, annular shrouds extending inwardly from said end rings toward said shaft, said annular shrouds, said end rings and said casing forming a motor chamber, said annular shrouds and said end plates forming end chambers at each end of the motor chamber, a motor rotor mounted on said shaft in said motor chamber, a motor stator in said motor chamber, means mounting said motor stator on said end rings, a first conduit adapted to be connected to a source of cooling fluid under pressure, said first conduit being in fluid communication with the interior of said casing between said end rings for conducting cooling fluid to said casing, a second conduit in fluid communication with said first conduit and said end chambers for conducting cooling fluid from said first conduit to said end chambers, fans mounted on said shaft and positioned within said annular shrouds for moving cooling fluid from the end chambers to said motor chamber, and a third conduit in fluid communication with the motor chamber of said casing for conducting cooling fluid from said casing.

References Cited in the file of this patent

UNITED STATES PATENTS

| | | |
|---|---|---|
| 1,879,625 | Mendenhall et al. | Sept. 27, 1932 |
| 2,185,740 | Smith | Jan. 2, 1940 |
| 2,725,012 | Zimsky | Nov. 29, 1955 |
| 2,793,506 | Moody | May 28, 1957 |
| 2,814,254 | Litzenberg | Nov. 26, 1957 |

FOREIGN PATENTS

| | | |
|---|---|---|
| 227,225 | Switzerland | Aug. 16, 1943 |